United States Patent [19]

Roy

[11] Patent Number: 5,561,210

[45] Date of Patent: Oct. 1, 1996

[54] SYNTHESIS OF SILOXANE-FUNCTIONAL TELECHELIC HYDROCARBON POLYMERS

[75] Inventor: Aroop K. Roy, Midland, Mich.

[73] Assignee: Dow Corning Corporation, Midland, Mich.

[21] Appl. No.: 453,240

[22] Filed: May 30, 1995

[51] Int. Cl.$^6$ .................................................. C08G 77/04
[52] U.S. Cl. .............................. 528/14; 528/25; 525/105; 525/106
[58] Field of Search .................................... 525/106, 105; 528/14, 25

[56] References Cited

U.S. PATENT DOCUMENTS

| | | | |
|---|---|---|---|
| 3,483,270 | 12/1965 | Bostick | 525/479 |
| 3,928,490 | 12/1975 | Hergarather | 525/479 |
| 4,172,100 | 10/1979 | Tung | 585/25 |
| 4,196,154 | 4/1980 | Tung | 260/665 |
| 4,205,016 | 5/1980 | Tung | 260/665 |
| 4,316,973 | 2/1982 | Kennedy | 525/335 |
| 4,960,842 | 10/1990 | Lo | 526/175 |
| 5,296,574 | 3/1994 | Hoxmeier | 528/25 |

FOREIGN PATENT DOCUMENTS

| | | |
|---|---|---|
| 520279 | 12/1992 | European Pat. Off. . |
| 1376446 | 6/1972 | United Kingdom . |

OTHER PUBLICATIONS

Journal of Polymer Science, No. 72, pp. 73–75 (1985); New Block Copolymers and Networks From Telechelic Prepolymers.
J. Am. Chem. Soc. 1995, 117, 3380–3388; Termination of Living Anionic Polymerization Using Chlorosilane Derivatives.
Polymer International, vol. 24, No. 4, (1991); 197–206; Dilithium Initiators Based On 1,3-bix(1-Phenylethenyl)benzene.
Polymer, 1982, vol. 23, Dec.; 1953–1959; An Efficient Bifunctional Lithium–Organic Initiator To Be Used In Apolar Solvents.
Macromolecules, vol. 11, No. 3, May–Jun. 1978, 616–617; Dilithium Anionic Initiators Based On Double 1,1 Diphenylethylene Compounds.
Polymer Preprints 1989, vol. 30, No. 1, Apr. 1989; Synthesis Of Poly (Butadiene)–Syndiotactic Poly (Methylmethacrylate) ABA Block Copolymers.
Macromolecules 1993, 26, 2137–2138; Acyclic Diene Metathesis (ADMET) Depolymerization.
Chinese Journal of Applied Chemistry, vol. 4, No. 5 (1987) pp. 11–14.
J. Polymer Science: Part B: Polymer Physics, vol. 30, 727–732 (1992) Relationship Between Crystallization Of The PDMS Block, et al.
Macromolecules 1994, 27, 2233–2240; Studies On Dilithium Initiators.
Macromolecules 1994, 27, 5957–5963; Efficiency Of The Sec–Butyllithium/m–Diisopropenylbenzene Diadduct, et al.
Macromolecules 1994, 27, 1680–1684; Hydrocarbon–Soluble DI–And Multifunctional Organolithium Initiators.
Macromolecules 1994, 27, 2219–2224; Studies On Dilithium Initiators. 1. Hydrocarbon Soluble Initiators.
Macromolecules 1994, 27, 2225–2232; Studies On Dilithium Initiators. 2. The Bimodal Molecular Weight Distribution In Polyiso–Prene.
Macromolecules 1994, 27, 2241–2248; Studies On Dilithium Initiators. 4. Effect Of Structure Variations.
Macromolecules 1994, 27, 2249–2255; Studies Of Dilithium Initiators. 5. Li NMR Analysis Of Ionic Species.

*Primary Examiner*—Ralph H. Dean
*Attorney, Agent, or Firm*—Alexander Weitz

[57] ABSTRACT

A method for preparing a telechelic polydiene having at least 70% 1,4-microstructure and at least 70% of its end groups capped by silanol-terminated siloxane functionality is disclosed, said method comprising:

(I) reacting, in a non-polar solvent solution,
  (A) at least one diene monomer,
  (B) a dianionic initiator which is soluble in said non-polar solvent and, optionally,
  (C) a polymerization adjuvant to form a dianionically active polydiene;

(II) reacting said dianionically active polydiene from step (I) with
  (D) a cyclic siloxane, in the presence of
  (E) a promoter selected from the group consisting of an organic sulfoxide, a tertiary amide and mixtures thereof to cap both ends of said dianionically active polydiene; and (III) quenching the capped product from step (II).

25 Claims, No Drawings

SYNTHESIS OF SILOXANE-FUNCTIONAL TELECHELIC HYDROCARBON POLYMERS

FIELD OF THE INVENTION

The present invention relates to a method for preparing a siloxane-functional telechelic hydrocarbon polymer or oligomer. More particularly, the invention relates to a method for synthesizing an α,ω-siloxane-functional polymer by first polymerizing a diene monomer in a non-polar solvent using a dianionic initiator to form a living polymer dianion, capping both ends of the living polymer by reaction with a cyclic siloxane in the presence of a promoter and then quenching the system.

Background of the Invention

Conventional hydrocarbon-based polymers generally lack mechanisms for bringing about crosslinking via low-temperature or room-temperature cure (e.g., moisture cure or addition-cure). Such cure pathways are, however, well known in the case of siloxane polymers, and the development of such facile cure mechanisms for the organic systems is highly desirable. Thus, for example, a telechelic organic polymer having suitably reactive end-groups could be reacted through chain extension and/or crosslinking schemes to produce cured compositions having precise molecular weight between crosslinks, and therefore, more predictable and controllable properties.

A small number of telechelic (i.e., having two identical reactive end-groups) hydrocarbon polymers are known and these are generally prepared by anionic or cationic polymerization of olefins. However, only a few telechelic hydrocarbon polymer systems having endgroup functionality approaching 2.0 are known and only a handful of these have reactive or potentially reactive silyl or siloxane groups at the ends (see, for example, Kennedy et al., *J. Polym. Sci. Polym. Symp.*, V. 72, 73, 1985; Marmo et al., *Macromolecules*, V. 26, 2137, 1993; U.S. Pat. No. 4,316,973 to Kennedy; and European Patent Application 0520279). However, to the best of the inventor's knowledge, the synthesis of conjugated diene-based polymers having at least 70 mol percent 1,4 microstructure and containing a reactive silyl species at each end, wherein the molecular weight can be effectively controlled during synthesis, has not been disclosed.

A viable method for synthesizing telechelic polydiene having a siloxane group at each end comprises anionic polymerization of a diene monomer using a difunctional metal-based initiator (i.e, one capable of simultaneously initiating two polymer chains which grow outward from the initiator site). Two types of such initiators are available. The first (initiator A) is based on alkali metals such as Li, Na, or K in conjunction with an aromatic compound such as naphthalene; this system is generally used in a polar solvent (e.g., tetrahydrofuran). The second (initiator B) is a dimetallated, usually aromatic, hydrocarbon; this initiator can be used in polar or non-polar reaction environments. Those skilled in the art will recognize that the reaction conditions during initiation and polymerization can have profound effects on the molecular weight, molecular weight distribution and structural characteristics of the resulting polymers, particularly in the case of polydienes. Thus, in polar solvents such as tetrahydrofuran, initiator A can provide telechelic polymers having narrow polydispersity for monoolefins such as styrene and for siloxanes. In non-polar solvents, however, initiation can be heterogeneous, resulting in a broad molecular weight distribution and poor control over molecular weight. This is due to the very poor solubility of the metal/naphthalene dianionic initiator in a non-polar solvent. On the other hand, initiators of type B have slightly higher solubility in non-polar solvents and are, therefore, better suited for use therein.

From a structural perspective, anionic polymerization of dienes such as butadiene and isoprene is extremely sensitive to the polarity of the solvent used in polymerization. Polar solvents such as tetrahydrofuran (THF), even at very low proportions in an otherwise non-polar environment, lead to a high degree of 1,2 addition with butadiene and 3,4-addition with isoprene. However, it is the 1,4-addition mode which is highly desired since this structure imparts a relatively low glass temperature and can be formulated to provide good elastomeric properties. For these monomers, a non-polar solvent and, therefore, initiators of type B are required to obtain useful elastomeric polymers. Thus, when a type A initiator, such as the lithium naphthalene catalyst of the examples in European Patent Application 0520279 is used to polymerize a diene in a non-polar solvent, a small amount of a polar solvent is needed to prepare and (presumably) solubilize the catalyst. This, in turn, leads to a relatively low 1,4 addition, as shown in the examples of this European patent application, and any rubbery properties of the resulting copolymers are probably derived from the siloxane component.

In view of the above stated problems associated with type A initiators, a number of dianionic initiators of type B have been developed and used to polymerize diene monomers. For example, 1,3-bis(1-lithio-1,3-dimethylpentyl)benzene initiator, the synthesis of which from m-diisopropenylbenzene is shown in equation (1), has been used in a non-polar reaction environment by Lutz et al. in *Polymer*, V. 23, 1953, 1982 to polymerize isoprene and styrene.

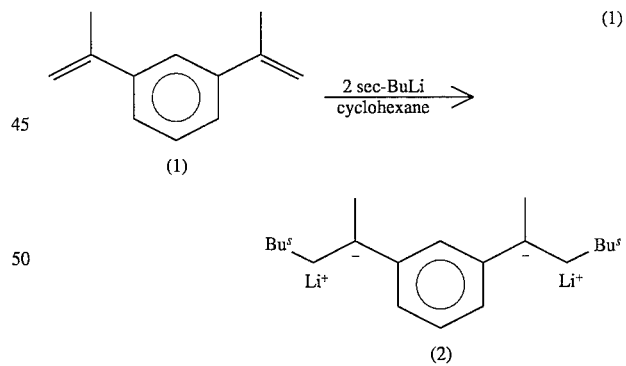

Similarly, a family of difunctional initiators based on a double 1,1-diphenylethylene structure is known to be an effective initiator for the synthesis of styrene-isoprene-styrene and styrene-butadiene-styrene triblock copolymers when used in conjunction with an amine or alkoxide polymerization adjuvant (see Tung et al., *Macromolecules*, 11, 616, 1978 as well as U.S. Pat. Nos. 4,960,842; 4,205,016; 4,196,154; and 4,182,818). For example, the preparation of this type of difunctional initiator, 1,3-phenylene-bis(3-methyl-1-phenylpentylidene)bis(lithium), from 1,3-bis(1-phenylethenyl)benzene is shown below in equation (2) below.

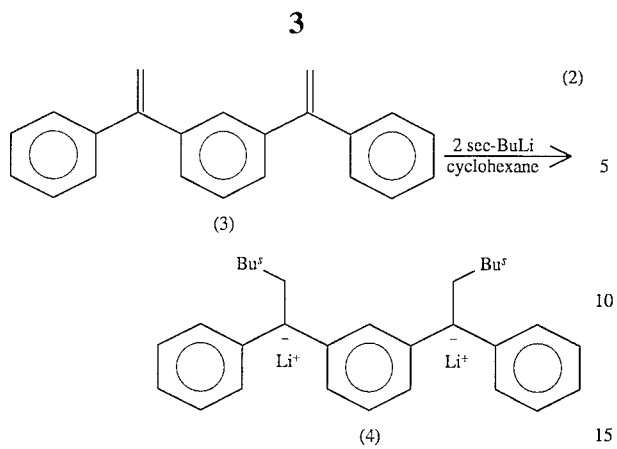

(2)

2 sec-BuLi / cyclohexane →

(3)

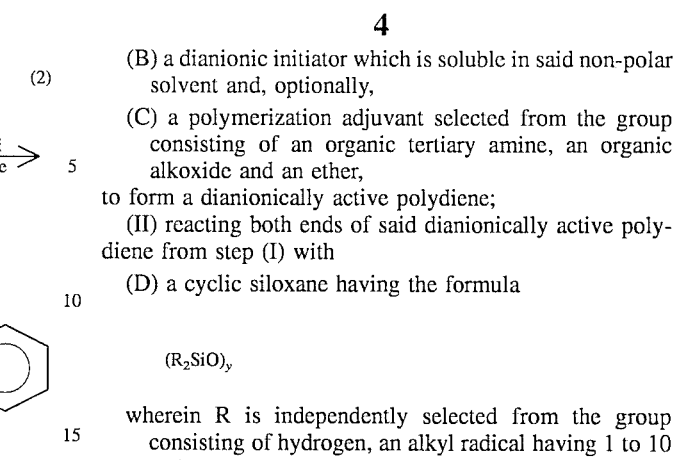

(4)

In the above equations, $Bu^s$ denotes secondary butyl radical. However, when the above mentioned 1,3-phenylene-bis(3-methyl-1-phenyl-pentylidene)bis(lithium) initiator and amine polymerization adjuvant are used to polymerize, e.g., isoprene, capping of the resulting living polymer dianion with a chlorosilane or a cyclic siloxane is inefficient. For example, the fraction of active ends capped with the chlorosilane was less than about 70%. Such a low level of endcapping is considered unacceptable, e.g., in the formulation of a curable composition, wherein the end-groups are to serve as cross-linking sites. It is also known in the art that dianionically active initiators and polymers exhibit strong and complex association phenomena, particularly in non-polar media. For dianionically active polydienes, such as dianionically active isoprene, it is believed that the above mentioned association is responsible for the inefficient end capping.

SUMMARY OF THE INVENTION

It has now been discovered that special conditions are necessary to overcome the limitations of the above described methods wherein particular dienes are polymerized in a non-polar solvent and the resulting living polymer or oligomer is subsequently endcapped to produce a siloxane-functional telechelic polymer or oligomer. The method disclosed herein allows the preparation of a silanol-terminated siloxane-functional telechelic polydiene which has a high proportion of 1,4-addition (i.e., at least about 70% mol 1,4-microstructure), and a high degree of endcapping (at least about 70% mol). In preferred embodiments of the invention, the polydiene also has a narrow molecular weight distribution, typically exhibiting a polydispersity of ≦1.2 (i.e., weigh average molecular weight divided by number average molecular weight). These highly desirable results may be attained by restricting the amount of adjuvant present during the polymerization step while employing particular promoters, and levels thereof, during the capping reaction.

The present invention therefore relates to a method for preparing a siloxane-functional telechelic polydiene comprising:

(I) reacting, in a non-polar solvent solution, (A) at least one monomer having the general formula $$CH_2 = C(Q)CH = CH_2$$

wherein Q is selected from the group consisting of hydrogen, a methyl radical, fluorine and chlorine, (B) a dianionic initiator which is soluble in said non-polar solvent and, optionally, (C) a polymerization adjuvant selected from the group consisting of an organic tertiary amine, an organic alkoxide and an ether, to form a dianionically active polydiene;

(II) reacting both ends of said dianionically active polydiene from step (I) with (D) a cyclic siloxane having the formula $$(R_2SiO)_y$$

wherein R is independently selected from the group consisting of hydrogen, an alkyl radical having 1 to 10 carbon atoms and an aryl radical having 6 to 20 carbon atoms and y is 3 to about 12, in the presence of (E) a promoter selected from the group consisting of an organic sulfoxide, a tertiary amide and mixtures thereof, to cap said dianionically active polydiene; and (III) quenching the capped product from step (II) to form said telechelic polydiene, wherein said siloxane-functional telechelic polydiene has at least 70% 1,4-microstructure and has at least 70% of its end groups capped by said siloxane.

The invention further relates to the above method wherein the siloxane-functional telechelic polymer or oligomer is hydrogenated to prepare a partially saturated, or essentially fully saturated, polymer or oligomer.

The invention also relates to siloxane-functional telechelic polydienes, as well as hydrogenated versions thereof.

DETAILED DESCRIPTION OF THE INVENTION

The method according to the present invention comprises three separate steps: (I) polymerizing the diene monomer in a non-polar solvent to form a living polymer dianion, (II) reacting the living polymer dianion with a cyclic siloxane to form the siloxane-functional dianion and (III) quenching the latter dianion to form a telechelic polymer or oligomer.

In step (I), at least one diene monomer (A) having the general formula $CH_2 = C(Q)CH = CH_2$, wherein Q is selected from the group consisting of hydrogen, a methyl radical, fluorine and chlorine, is reacted in a non-polar solvent solution with (B) a dianionic initiator, optionally in the presence of (C) a polymerization adjuvant, to form a solution of a polydiene which is anionically active at both ends. It is contemplated herein that a single monomer or a mixture of diene monomers may be used as component (A), but preferred systems are based on homopolymers or copolymers of isoprene (i.e., $Q = CH_3$ in the above formula) and 1,3-butadiene (i.e., $Q = H$ in the above formula). It is also contemplated that up to about 10 mole percent of at least one other non-diene, olefinic, anionically polymerizable monomer (A'), described infra, may be used together with the diene (A) provided chain propagation is not hindered during the polymerization step, described infra and at least 70 mole percent of the repeat units based on the diene monomer (A) have a 1,4 microstructure (i.e., the repeat units are represented by the formula $-CH_2-C(Q)=CH-CH_2-$ wherein Q has its previous definition).

As used herein, a non-polar solvent is defined as a hydrocarbon which is fluid at the given reaction conditions and is inert with respect to all components used in the instant method. Specific examples of suitable non-polar solvents include aromatic solvents such as benzene, toluene and xylene; alkanes having 4 to 20 carbon atoms such as butane, pentane, hexane, heptane and octane; and cycloaliphatics having 5 to 20 carbon atoms such as cyclohexane, cyclooctane and cyclododecane, inter alia, cyclohexane and toluene being preferred.

For the purposes of the present invention, component (B), or a combination of (B) and (C), must be soluble in the above mentioned non-polar solvent and, as a soluble species, be capable of initiating polymerization of monomer (A) to produce a living polymer dianion having at least 70 mole percent 1,4 microstructure. Such initiators are exemplified by lithium compounds based on double 1,1-diphenylethylene. These initiators are well known in the art and are described, e.g., in U.S. Pat. Nos. 4,960,842; 4,205,016; 4,196,154; and 4,172,100, the specifications of said patents being hereby incorporated by reference. Preferably, they have the general structure described in U.S. Pat. No. 4,205,016. Most preferably, they have the general structure disclosed in U.S. Pat. No. 4,960,842, cited supra:

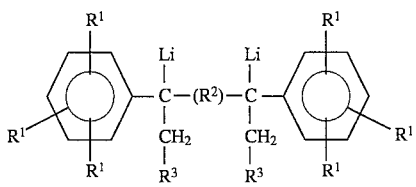

wherein $R^1$ is independently selected from the group consisting of hydrogen and an inert radical having up to 16 carbon atoms; $R^2$ is a divalent organic radical having at least 6 carbon atoms and having at least one aromatic ring which is directly attached to a carbon which is attached to an aromatic ring of the above formula; and $R^3$ is a monovalent radical having 1 to 20 carbon atoms which is independently selected from the group consisting of alkyl, cycloalkyl, aromatic, mixed alkyl/aromatic and mixed cycloalkyl/aromatic. In this context, the term "inert" indicates that the substituent $R^1$ does not interfere in any way with the polymerization and subsequent endcapping, as described infra. Examples of inert substituents in this regard include such radicals as fluorine, chlorine and alkoxy, inter alia. Most preferably, this type of initiator is the 1,3-phenylene-bis(3-methyl-1-phenyl-pentylidene)bis(lithium)    (4) described supra.

Component (B) is also exemplified by lithium compounds based on 1,3-dialkenylbenzene. These initiators are well known in the art (e.g., Lutz et al., cited supra) and have the general formula

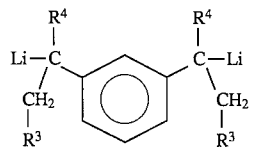

wherein $R^4$ is independently selected from the group consisting of hydrogen and an alkyl radical having 1 to 6 carbon atoms; and $R^3$ is as defined above. Preferably, this type of initiator is the above mentioned 1,3-bis(1-lithio-1,3-dimethylpentyl)benzene (2).

The initiator (B) is typically used at an initial concentration of up to about $10^{-1}$ molar in the polymerization solution, the amount employed being inversely related to the desired polymer molecular weight.

When the initiator is of the type based on double 1,1-diphenylethylene, a polymerization adjuvant (C) is used in the above first step. This adjuvant may be an organic tertiary amine, such as N,N,N',N'-tetramethylethylenediamine; an organic elkoxide, such as isopropoxide and sec-butoxide; or an ether, such as anisole Preferably component (C) is N,N N',N",N"-pentamethyldiethylenetriamine (PMDETA) which has the structure $(Me)_2$—N—$CH_2CH_2$—N(Me)—$CH_2CH_2$—N$(Me)_2$, wherein Me hereinafter denotes a methyl radical. For example, when component (A) is isoprene or butadiene, the ratio of moles of amine to the moles of active ends of the anionically active polydiene (i.e., the moles of lithium) is preferably in the range of about 1:20 to about 1:4, more preferably 1:8 to 1:6. In the case of isoprene polymerization, this ratio is preferably about 1:6. When this molar ratio is less than about 1:20, the polymer obtained generally has an unacceptably broad molecular weight distribution and/or has a bimodal distribution. On the other hand, when this ratio is greater than about 1:6, the polymerization results in less than about 70 mol % of the desirable 1,4 addition.

The above described polymerization reaction may be illustrated for the case of initiators based on double 1,1-diphenylethylene by the following generalized equation, wherein (DFI) represents the difunctional initiator, (j+k) is the degree of polymerization and Q has its previously defined meaning.

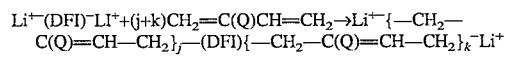

In a similar fashion, the initiator based on 1,3-dialkenylbenzene may be used to prepare a living polymer dianion. However, in this case, an adjuvant is not required and is preferably not used.

As mentioned above, the living polymer dianion, as well as the capped polymer or oligomer derived therefrom and described infra, consists essentially of units having the formula —$CH_2$—C(Q)=CH—$CH_2$— (i.e., the 1,4-microstructure). The living polymer dianion may also be optionally further reacted with another anionically polymerizable monomer (A') before being capped, as described infra. For example, when the initiator based on double 1,1-diphenylethylene is employed, this additional monomer (A') polymerizes at both ends to form a new living polymer dianion of the type

in which G represent a polymer or oligomer segment based on (i.e., formed from) the above described diene monomer and, optionally, up to 10 mole percent of monomer (A'), the polydiene segments of G having at least 70% 1,4-microstructure. In formula (I), Z represents a polymer or oligomer segment based on (i.e., formed from) the optional monomer (A'). Likewise, when the initiator is of the type based on 1,3-dialkenylbenzene, this additional monomer (A') polymerizes at one end to form a new living polymer dianion of the type

in which G and Z are as defined above. The additional monomer (A') may be illustrated by such compounds as styrene, methylmethacrylate, methylacrylate, acrylonitrile and vinyl chloride, inter alia. Preferably, (A') is styrene.

The above described polymerization reactions are carried out under dry, inert (e.g., nitrogen purge) conditions, typically at a temperature of 0° C. to 80° C. However, it is preferred that the polymerization time is kept short (e.g., below about 2 hours at >40° C.) in order to obtain a narrow molecular weight distribution (i.e., ≦1.2). At longer polymerization times, the polydispersity has been observed to increase and a bimodal molecular weight distribution often results. Although there is no intent to limit the invention based on any mechanism or theory, it is believed that this broadening of molecular weight distribution is due to complex chain transfer reactions which adversely affect the telechelic character of the resulting polymer and limit the utility thereof in crosslinking and/or chain extension applications.

In the second step according to the instant invention, the living polymer dianion obtained in step (I) (in the non-polar solvent solution) is reacted with a cyclic siloxane (D) having the formula $(R_2SiO)_y$, wherein R is independently selected from the group consisting of hydrogen, an alkyl radical having 1 to 10 carbon atoms and an aryl radical having 6 to 20 carbon atoms and y is 3 to about 12 to cap the polymer dianion at both ends. Preferred cyclic siloxanes contain dimethylsiloxane units, methylhydrogensiloxane units, phenylmethylsiloxane units, or mixtures of these siloxane units, and y is preferably 3 or 4. The capping reaction is carried out in the presence of a promoter (E), which is preferably added after the introduction of the cyclic siloxane. The promoter is selected from organic sulfoxides, such as dimethylsulfoxide, ethylmethylsulfoxide and diphenylsulfoxide; or tertiary amides, such as dimethylformamide (DMF) and dimethylacetamide (DMAC).

In order to obtain the high degree of capping according to the present invention (i.e., capping at least 70% of the endgroups), it is necessary to add a catalytic amount of the above described promoter. The exact amount needed to obtain a capping efficiency of at least 70% may be determined by routine experimentation but is generally in the range of about 0.025 to 0.125% based on the total volume of the living polymer dianion solution. Although not a critical limit, a promoter level of greater than about 0.125% increases the risk of "poisoning" the hydrogenation catalyst used to prepare saturated counterparts of the telechelic polydienes, as described infra. The siloxane-terminated living polymer dianion obtained is then subjected to a quenching reaction to form the telechelic polydiene.

This capping scheme is represented by the following generalized equations, wherein only one end of the living polymer dianion is shown for the sake of simplicity:

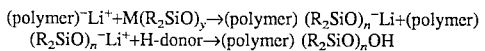

(polymer)$^-$Li$^+$+M(R$_2$SiO)$_y$→(polymer) (R$_2$SiO)$_n^-$Li+(polymer) (R$_2$SiO)$_n^-$Li$^+$+H-donor→(polymer) (R$_2$SiO)$_n$OH In these equations, R and y have their previously defined meanings m is the number of moles of cyclic siloxane used and n is the degree of polymerization of the siloxane terminal chain. For the purposes of the present invention, n is 3 to about 10,000, preferably 3 to about 1,000, more preferably 3 to about 100 and most preferably 3 to about 12. The second of these equations, representing the quenching reaction, is carried out by adding a proton donor, such as an alcohol, an organic acid or water, to the siloxane-terminated living polymer dianion. Examples of suitable quenching agents include ethanol, propanol, acetic acid and water, acetic acid being preferred. The actual capping reaction using the cyclic siloxane (i.e., the first of the above two equations) is also carried out under dry, inert conditions, typically at a temperature of 0° to 60° C. The quenching is generally run at room temperature.

The skilled artisan will recognized that, when the above mentioned optional anionically polymerizable monomer (A') is used to form the living polymer dianions shown in formulas (I) or (II), the final telechelic copolymer will have a main chain of the formula (III) or formula (IV), respectively:

—ZGZ— (III)

—GZ— (IV)

wherein G is and Z are as defined above and at least 70% of the end groups of the copolymer are of the formula —(R$_2$SiO)$_n$OH, in which R and n have their previously defined meanings.

It is also preferred that an ether solvent, such as tetrahydrofuran (THF), is added to the reaction medium in the instant process. This addition preferably takes place after step (I) and may be done before, or concurrent with, the addition of the promoter. The main advantage of this added solvent is reduction of reaction medium viscosity, an important consideration in commercial applications.

After the above described synthesis, the telechelic polymer or oligomer of the present invention may be isolated from the non-polar solvent solution by any conventional means. For example, the solvent may be stripped out at elevated temperature and/or reduced pressure or the polymer precipitated from solution by adding a polar solvent such as methanol. Preferably, the polymer is stripped of solvent and then purified by repeated dissolution/precipitation, as illustrated in the examples, infra.

A siloxane-functional telechelic diene polymer prepared according to above methods can be hydrogenated to produce the corresponding partially saturated or essentially fully saturated telechelic polymer. These saturated polymers would be expected to have improved stability (e.g., thermal, oxidative, u.v. radiation) and have superior mechanical properties relative to the unsaturated parent materials.

The hydrogenation can be carried out in a solvent at either low pressure (e.g., atmospheric) or at high pressures by techniques known in the art using homogeneous or heterogeneous catalysis. Suitable catalysts for this purpose include such systems as Pt/carbon, Pd/carbon and Co/Ni carboxylates (for homogeneous reaction), a preferred catalyst system being palladium-on-carbon. However, when an amine is used in the above described preparative method as the polymerization adjuvant, essentially all of the amine may have to be removed prior to hydrogenation since it can "poison" the hydrogenation catalyst. Removal of residual amine, sulfoxide or amide may be accomplished by, e.g., passing the polymer through acid alumina or, preferably, stirring the unsaturated polymer solution over 10% Pd/C for 12–18 hours, followed by filtration. Near-complete (>98%) hydrogenation of the telechelic polydienes can best be achieved by hydrogenating at higher hydrogen pressure (e.g., 5 to 100 atmospheres).

The unsaturated, but preferably the saturated, siloxane-functional telechelic polymers produced according to the methods disclosed herein find utility in the formulation of compositions for adhesives, sealants, elastomers, rubbers and coatings.

Curable compositions can be prepared by methods conventionally used in the silicone arts for the above described telechelic polymer having reactive siloxane ends. Thus, the polymers having ≡SiOH ends can be cured by condensation using an organotin catalyst. Alternatively, the polymer having such ≡SiOH ends can be further capped with a silane which contains hydrolyzable groups such as acyloxy, alkoxy, and oxime to provide a room temperature, moisture curable system. Additionally, the ≡SiOH end groups can be converted to other reactive systems, such as vinyl, by reaction with, e.g., vinyldimethylchlorosilane in the presence of pyridine.

EXAMPLES

The following examples are presented to further illustrate the method of this invention, but are not to be construed as limiting the invention, which is delineated in the appended claims. All parts and percentages in the examples are on a weight basis and all measurements were obtained at 25° C., unless indicated to the contrary. In the examples, Me and Bu denote methyl and butyl radicals, respectively.

Materials

Isoprene, sec-BuLi solution (1.3M in cyclohexane), anhydrous tetrahydrofuran (THF), anhydrous dimethylsulfoxide (DMSO), pentamethyldiethylenetriamine (PMDETA) and 1,3-diisopropenylbenzene (1) were obtained from Aldrich Chemical Company, Milwaukee, Wis. 1,3-bis(1-phenylethenyl)benzene (3) was obtained from the Dow Chemical Company, Midland, Mich.

General Procedures

Isoprene was distilled in small batches from $CaH_2$ after stirring over the hydride for 18 hours, and stored at −25° C.

PMDETA, 1,3-diisopropenylbenzene (3) and dimethylsiloxane cyclic trimer were stirred/distilled from $CaH_2$. The distilled reagents were transferred inside a glove bag, under nitrogen, to dry glass bottles equipped with rubber septa for storage.

The sec-BuLi solution was titrated with 1.0M sec-butanol in xylene using 1,10-phenanthroline as indicator to obtain its exact molarity according to the method of Watson and Eastham (*J. Organomet. Chem., V.* 9, 165, 1969).

Eighty grams of 1,3-bis(1-phenylethenyl)benzene (3) was dissolved in 400 mL of Optima™ grade 2-propanol (Fisher Scientific Co., Pittsburgh, Pa.) by stirring and heating to 40°–50° C. in a round-bottomed flask. A further 200 mL of this solvent was added and the solution was cooled overnight at about −15° C. The crystals that formed were filtered cold under vacuum and washed once with cold (−15° C.) 2-propanol. The last traces of solvent were removed under vacuum (0.1 mm, 4 h) at room temperature. Recovery of recrystallized (3) was about 60 g.

Anhydrous THF from Aldrich, and HPLC-grade cyclohexane from Fisher were distilled from sodium/benzophenone ketyl and stored in oven-dried amber bottles which had been allowed to cool under a stream of dry nitrogen. The bottles were stoppered with doubled rubber septa.

Polymer characterization was performed using $^1$H NMR (200 MHz/400 MHz) spectroscopy and gel permeation chromatography (GPC) with polyisoprene standards from Scientific Polymer Products (Ontario, N.Y.). Number ($M_n$) and weight ($M_w$) average molecular weights were reported. The degree of endcapping was determined by integration of appropriate signals in the proton NMR spectra.

All initiator preparation, polymerization and endcapping reactions were performed under an atmosphere of dry, oxygen-free nitrogen.

Example 1

An oven-dried (125° C.), 3-neck, 1L flask containing a magnetic stirring bar was equipped with a rubber septum, gas inlet and stopper. All glass-to-glass connections were made using clean, dry teflon sleeves at the flask necks. The flask was evacuated hot, allowed to cool under vacuum, then back filled with nitrogen. A positive nitrogen pressure was maintained at a mineral oil "bubbler" (attached to the gas inlet of the flask by a "Y" connector) throughout the course of reaction. The flask was charged with the initiator precursor 1,3-bis(1-phenylethenyl)benzene (3) (0.564 g, 0.002 mol) under a nitrogen purge. The flask was then reevacuated for 30 minutes at room temperature and backfilled with nitrogen. Dry cyclohexane (400 mL) was transferred to the flask by cannula and the solution heated to 40°–45° C. Sec-BuLi was withdrawn into a dry syringe then slowly added to the flask through the rubber septum until the first permanent appearance of a yellow-orange color. A stoichiometric amount of the sec-BuLi required for complete dianion formation (0.004 mol) was then added. The solution was then heated at 58°–61° C. for 3 h to ensure complete formation of the dianion 1,3-phenylene- bis(3-methyl-1-phenylpentylidene)bis(lithium) (4). After cooling the solution to about 25° C., PMDETA (0.15 mL, 0.0007 mol) was added using a microliter syringe. Thus, the amine:living end ratio was about 16 (i.e., 0.004/0.0007=5.8 or 1:5.8). Upon stirring this mixture for 10 min, isoprene (20.0 mL, 0.200 mol) was added, the mixture was stirred for 10 minutes at room temperature, then for 90 minutes at 50°–51° C. to prepare a living polyisoprene dianion.

A solution of hexamethylcyclotrisiloxane, $(Me_2SiO)_3$, in THF (concentration: 1 g siloxane in 1.88 g solution) was added to the flask via syringe. This completely gelled the solution, but no loss of the brown-red color of the living polymer dianion occurred. Anhydrous dimethyl sulfoxide (DMSO) promoter (0.2 mL) was added to the flask via syringe and the temperature of the bath was raised to 55°–58° C. The gel disappeared and a colorless, but very viscous, solution formed over a 30 minute interval. Heating was continued for another 1.5 h, whereupon the solution was stirred for 14–16 h at room temperature. About 0.5 mL glacial acetic acid was added (the viscosity of the solution immediately dropped significantly) and the mixture was stirred for an additional one hour to produce an SiOH-ended polymer. Solvents and volatiles were then stripped at 52°–55° C. under vacuum, and the polymer was purified by precipitation from THF into methanol followed by vacuum drying at 60° C. for 20 h.

A summary of the amounts of the ingredients used in this example appears below: Cyclohexane—400 mL. Difunctional initiator precursor (3) —0.564 g, 0.002 mol (i.e., 0.004 mol total anion). PMDETA—0.150 mL, 0.0007 mol. Isoprene—20.0 mL, 0.200 mol. Hexamethylcyclotrisiloxane, $(Me_2SiO)_3$,— 1.78 g, 0.008 mol (100% molar excess). DMSO—0.2 mL. Glacial acetic acid—0.5 mL.

Characterization (SiOH-ended polymer): Microstructure—73% 1,4-addition; molecular weight—$M_n$=9000, $M_w/M_n$=1.17; percent endcapping (based on only —$SiMe_2O$—$SiMe_2O$—$SiMe_2OH$ ends present)=73%.

This example demonstrates that DMSO is an effective promoter when the endcapping reagent is a cyclic siloxane. Little or no endcapping was observed when the amine is used alone or when up to 20% v/v THF is used in place of the DMSO promoter under similar endcapping conditions.

Example 2

The procedure of Example 1 was essentially repeated, except that an amine to living end ratio of 1:10 was used for the polymerization step. Even though about 84% 1,4 addition and about 80% endcapping with HO—(Me$_2$SiO)$_3$— was obtained, the molecular weight distribution was bimodal, this being indicative of complex propagation phenomena.

Example 3

Hydrogenation catalyst consisting essentially of 10% palladium-on-carbon (1.1 g, equivalent to Pd:C=C ratio 1:200) was weighed into a dry, nitrogen-purged, 500 mL glass Parr hydrogenation bottle. An 8 g batch of SiOH-ended polymer from Example 1 was dissolved in dry cyclohexane (50 mL) and then filtered through acid alumina (Fisher Scientific) with 150 mL of cyclohexane used during this elution. The cyclohexane was removed and 4.7 g of the purified polymer was redissolved in 45 mL of dry cyclohexane for hydrogenation. The bottle was set up in a Parr Low Pressure Hydrogenator and purged thrice with hydrogen at 56 psig. Hydrogenation was then carried out in the cyclohexane for 72 h at 60° C. and 56 psig H$_2$ pressure. The solution was centrifuged to remove most of the carbon, then pressure-filtered through a 0.8 µm nylon membrane filter under 80 psig argon pressure. The filtrate was stripped at 60° C. under vacuum to remove the solvent, and the polymer was vacuum dried for 24 h at 65° C. whereupon the polymer was found to be about hydrogenated.

This example indicated incomplete removal of residual amine (PMDETA) from the polymers by the acid alumina column. Consequently, the polymer was filtered through palladium-on-carbon, the hydrogenation catalyst itself, in an effort to remove the suspected PMDETA catalyst poison (see Example 4).

Example 4

A 3.0 g batch of polymer from Example 1 was stirred for 16 h with 0.25 g 10% Pd/C in cyclohexane (20 mL). This solution was filtered through 0.45 µm nylon membrane filter and stripped to remove solvent. The polymer was then hydrogenated in cyclohexane (50 mL) at 60 psig H$_2$ pressure/60° C./72 h, using 0.5 g of 10% Pd/C as catalyst. After filtration, stripping, and drying, as in Example 3, the polymer was found to be 93% hydrogenated.

Since the degree of hydrogenation was as high as for a similar system wherein the polymer was prepared without PMDETA, it was concluded that filtration from Pd/C (or treatment with an appropriate amine removal agent, such as mild acid) is necessary to effectively remove residual PMDETA where it is used in the polymerization/endcapping reactions.

Example 5

In order to achieve a higher degree of saturation, a high pressure hydrogenation was carried out. The 93% hydrogenated polymer from Example 4 (2.65 g) was loaded (together with 0.02 g 10% Pd/C and 50 mL cyclohexane) into a clean, dry, stirred Hastalloy Parr reactor of 160 mL capacity. After purging thrice with H$_2$ at 350 psig, hydrogenation was carried out for 20 h, at 150° C. and 410 psig H$_2$ pressure. After filtration, stripping, and drying, as in Example 4, the total degree of hydrogenation was found to be 98–99%. Molecular weight determination by GPC (against polyisoprene standards) showed $M_n$=10000, $M_w/M_n$=1.17, essentially the same as for the parent polymer from Example 1. Thus, high pressure hydrogenation using Pd/C catalyst provides nearly saturated telechelic hydrocarbon polymer having reactive siloxane functionality.

Example 6

A 0.5 g sample of the polymer from Example 5, containing SiOH ends was thoroughly mixed with 0.094 g of the crosslinking agent vinyl{tri(ethylmethylketoximo)}silane and 2 mL of anhydrous toluene in an aluminum weighing dish. This composition was exposed to ambient air at room temperature to effect a moisture cure. The polymer was virtually tack-free after 24 hours, and completely cured in 48–72 hours to provide a clear, elastomeric film.

That which is claimed is:

1. A method for preparing a siloxane-functional telechelic polydiene comprising:
   (I) reacting, in a non-polar solvent solution, a mixture comprising
      (A) at least one monomer having the general formula

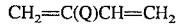
      $$CH_2=C(Q)CH=CH_2$$

wherein Q is selected from the group consisting of hydrogen, a methyl radical fluorine and chlorine, and
      (B) a dianionic initiator selected from the group consisting of lithium compounds based on double 1,1-diphenylethylene and lithium compounds based on 1,3-dialkenylbenzene
   to form a dianionically active polydiene;
   (II) reacting said dianionically active polydiene from step (I) with
      (D) a cyclic siloxane having the formula

      $$(R_2SiO)_y$$

wherein R is independently selected from the group consisting of hydrogen, an alkyl radical having 1 to 10 carbon atoms and an aryl radical having 6 to 20 carbon atoms and y is 3 to 12, in the presence of
      (E) a promoter selected from the group consisting of an organic sulfoxide, a tertiary amide and mixtures thereof to cap the ends of said dianionically active polydiene; and
   (III) quenching the capped product from step (II) to form said telechelic polydiene, wherein said siloxane-functional telechelic polydiene has a polydispersity of ≦1.2, has at least 70% 1,4-microstructure and has at least 70% of its end groups capped by said siloxane.

2. The method according to claim 1, further comprising hydrogenating said siloxane-functional telechelic polydiene.

3. The method according to claim 1, wherein said monomer (A) is isoprene.

4. The method according to claim 1, wherein said monomer (A) is 1,3-butadiene.

5. The method according to claim 1, wherein said mixture of step (I) further comprises
   (C) a polymerization adjuvant selected from the group consisting of an organic tertiary amine, an organic alkoxide and an ether,
and said initiator (B) is a lithium compound based on double 1,1-diphenylethylene.

6. The method according to claim 5, wherein R of said cyclic siloxane (D) is selected from the group consisting of hydrogen, methyl and phenyl.

7. The method according to claim 5, wherein said adjuvant (C) is an organic tertiary amine.

8. The method according to claim 7, wherein said promoter (E) is selected from the group consisting of dimethylsulfoxide, dimethylformamide and dimethylacetamide.

9. The method according to claim 8, wherein R of said cyclic siloxane (D) is selected from the group consisting of hydrogen, methyl and phenyl.

10. The method according to claim 9, wherein R of said cyclic siloxane (D) is methyl.

11. The method according to claim 1, wherein said initiator (B) is a lithium compound based on 1,3-dialkenylbenzene.

12. The method according to claim 11, wherein said promoter (E) is selected from the group consisting of dimethylsulfoxide, dimethylformamide and dimethylacetamide.

13. The method according to claim 12, wherein R of said cyclic siloxane (D) is selected from the group consisting of hydrogen, methyl and phenyl.

14. The method according to claim 13, wherein R of said cyclic siloxane (D) is methyl.

15. A silyl-functional telechelic polydiene having a main chain consisting essentially of repeat units based on a diene of the formula

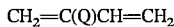

$CH_2=C(Q)CH=CH_2$ in which Q is selected from the group consisting of hydrogen, a methyl radical, fluorine and chlorine, wherein at least 70% of said repeat units based on said diene have a 1,4-microstructure and a polydispersity of $\leq 1.2$, and wherein at least 70% of the terminal groups of said polydiene have the formula $-(R_2SiO)_nOH$ in which R is selected from the group consisting of hydrogen, an alkyl radical having 1 to 10 carbon atoms and an aryl radical having 6 to 20 carbon atoms and n is 3 to about 10,000.

16. The polydiene according to claim 15, wherein Q is hydrogen.

17. The polydiene according to claim 15, wherein Q is a methyl radical.

18. The polydiene according to claim 15, wherein R of said terminal groups is selected from the group consisting of hydrogen, methyl and phenyl.

19. The polydiene according to claim 18, wherein R of said terminal groups is methyl.

20. The polydiene according to claim 15 which is hydrogenated.

21. The polydiene according to claim 18 which is hydrogenated.

22. The polydiene according to claim 19 which is hydrogenated.

23. A silyl-functional telechelic copolymer having a main chain formula selected from the group consisting of

—ZGZ— and

—GZ— wherein G is a polydiene segment consisting essentially of repeat units based on a diene of the formula

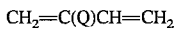

$CH_2=C(Q)CH=CH_2$ in which Q is selected from the group consisting of hydrogen, a methyl radical, fluorine and chlorine and Z represents a segment consisting essentially of repeat units based on a non-diene, olefinic, anionically polymerizable monomer, at least 70% of said repeat units based on said diene having a 1,4-microstructure and a polydispersity of $\leq 1.2$, and at least 70% of the terminal groups of said copolymer having the formula $-(R2SiO)nOH$ in which R is selected from the group consisting of hydrogen, an alkyl radical having 1 to 10 carbon atoms and an aryl radical having 6 to 20 carbon atoms and n is 3 to about 100,000.

24. The copolymer according to claim 23 which is hydrogenated.

25. The copolymer according to claim 23, wherein said non-diene monomer is styrene.

\* \* \* \* \*